ELECTRICAL CONTACT MATERIAL

Filed Oct. 4, 1965

INVENTORS
EDMAN F. HOLT
PETER C. MURPHY
BY Robert Lucas
ATTORNEY

United States Patent Office 3,401,024
Patented Sept. 10, 1968

3,401,024

ELECTRICAL CONTACT MATERIAL

Edman F. Holt and Peter C. Murphy, Indianapolis, Ind., assignors to P. R. Mallory & Co., Inc., Indianapolis, Ind., a corporation of Delaware Filed Oct. 4, 1965, Ser. No. 492,763
11 Claims. (Cl. 29—182.2)

ABSTRACT OF THE DISCLOSURE

An electrically and thermally conductive composite consisting of two highly conductive materials, e.g., copper and silver. At least one of said materials having a coating of a barrier material e.g., iron, nickel, cobalt or their alloys to separate the conductive materials, such that each of said materials retain its own identity.

The present invention relates to electric contacts and more particularly relates to means and methods for obtaining a lower cost substitute for silver in electrical and thermal contacts.

Conventional alloys of silver used as electrical contacts contain from 70% to 100% silver by weight in order to obtain necessary properties and performance. However, as silver is diluted by copper or other soluble alloys, it tends to lose its properties of high electrical conductivity and oxidation resistance.

Therefore, it is an object of the present invention to provide a low-silver content contact material having the necessary properties of high electrical and thermal conductivity, high resistance to oxidation and low contact resistance exhibited by silver-rich alloys.

It is an object of the present invention to provide a silver-containing contact material wherein no alloying occurs between the silver and the other metal contained therein.

It is an object of the present invention to provide a high density silver-copper compact for electrical and thermal contacts and the like wherein substantially no alloying or diffusion takes place between the metals therein.

It is an object of the present invention to provide a silver-copper compact material having good electrical and thermal conductivity wherein either one or both of the metal particles are coated with a higher melting point material to physically separate the silver and copper particles and prevent diffusion or alloying therebetween.

It is an object of the present invention to provide a low-silver content contact which will perform the needed functions of making and breaking an electrical circuit at a considerably lower cost than was formerly possible.

The present invention, in another of its aspects, relates to novel features of the instrumentalities described herein for teaching the principal object of the invention and to the novel principles employed in the instrumentalities whether or not these features and principles may be used in the said object and/or in the said field.

Other objects of the invention and the nature thereof will become apparent from the following description considered in conjunction with the accompanying drawings and wherein like reference numbers describe elements of similar function therein and wherein the scope of the invention is determined rather from the dependent claims.

For illustrative purposes, the invention will be described in conjunction with the accompanying drawings in which.

Figure 1:
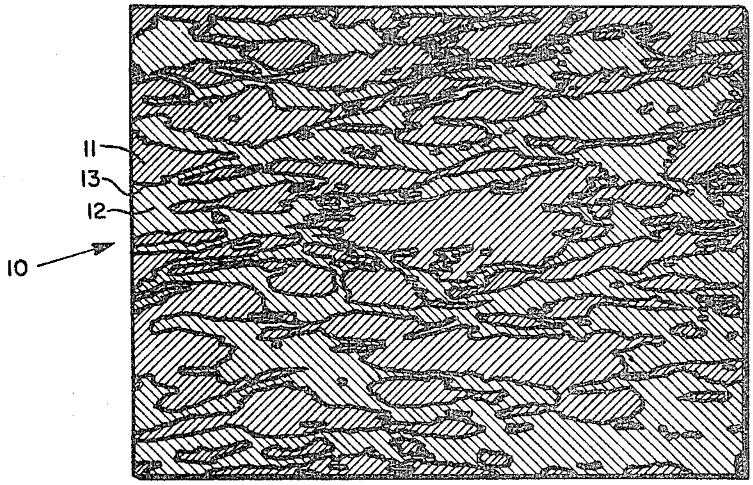
FIGURE 1 is a longitudinal cross sectional view of a typical compact.

Generally speaking the present invention consists of a unique copper-silver contact material having superior electrical and thermal conductivities, low contact resistance and high oxidation resistance and a process for obtaining said material. The material is produced from a mixture of silver and copper powder, granules or fibers, either material being coated with a barrier material to prevent diffusion or alloying therebetween. The mixture is blended, consolidated by conventional means into a suitable billet, and subjected to stress-relieving anneals. All steps must be carried out so that the formation of silver-copper alloys or any other solid solutions is substantially eliminated as this drastically lowers the thermal and electrical properties of the composite body, including the oxidation resistance and contact resistance. This is accomplished by controlling the temperature throughout the manufacture of the composite and particularly in the stress-relieving anneals so that it does not exceed 1400° F., in combination with the use of a barrier layer between the two metals to prevent alloying and/or diffusion therebetween.

Either the copper or silver is first coated with a barrier metal such as iron, nickel, cobalt, or their alloys or metallic compounds. The coating may comprise up to 10% by weight of the total composition of the composite material, although coatings on the order of approximately 2 angstroms are suitable. Metallic halides are also suitable as they not only form a barrier between the copper and the silver, but they also cleanse the composite of any oxides and prevent further oxide formation thereby keeping the electrical resistance low.

The selection of a barrier material depends upon a number of factors. While the precious metals would be suitable in some respects, it is an object of the present invention to provide a low cost material and therefore the economic factor eliminates the suitability thereof. Metals which readily oxidize or whose oxides are not readily reduced are unsuitable, as are metals which would readily diffuse into copper or silver or alloy therewith, or metals which would readily form nitrides. The metal, alloy or metallic compound selected must have a melting point above that of copper and silver and must lend itself to ease of coating. Iron, nickel, cobalt and their alloys and metallic compounds have been found to meet all of the above requirements and are most suitable in the practice of the present invention.

The copper and silver powders are then blended in ranges of 20% to 70% by weight of copper, 30% to 80% by weight of silver and up to 10% by weight of a barrier material. The mixture is compacted by powder metallurgy techniques and either cold extruded or preheated to facilitate extrusion in a nonoxidizing atmosphere, either inert or reducing, and then extruded. The preheating time prior to extrusion should be done as quickly as possible to prevent the formation of a solid solution between the barrier material and silver and copper or diffusion therebetween. While preheating in a furnace, using a nonoxidizing atmosphere, is suitable, a more rapid method such as induction heating is preferred. After extrusion, the wires are pull drawn to a suitable diameter with intermediate anneals wherever necessary. The annealing can be done in a salt bath, or in a protective atmosphere in a furnace at temperatures generally in the range of 400° C. to 700° C.

As a typical example of the materials and methods employed in the present invention, a mixture of 50% by weight of 200 mesh nickel-coated silver powder and 50% by weight of 100 mesh copper powder is blended together for 2 hours. The mixture is then hydrostatically pressed into a billet, and the billet is preheated in a hydrogen atmosphere to approximately 1400° F., and extruded into a 0.500" diameter rod. The extruded rod is then drawn to the desired size and suitable rivets or similar shapes made therefrom. The resultant elements are then given a stress-releaving anneal at 450° C., which typically results in a minimum electrical conductivity of 95% I.A.C.S. The fused alloy version of the same composition typically yields an electrical conductivity value of 80% to 85%. A further important property of the material provided by the present invention is its oxidation resistance. Oxide formation at the surface interfaces of the material creates an insulating film which interferes with the dissipation of heat and the introduction of electrical current into and out of the conductor and creates contact resistance on electrical make and break contacts and the like which causes the contacts to overheat. The oxidation resistance of the silver-copper composite is far superior to that of fused alloys of the same percentage composition.

Figure 2:
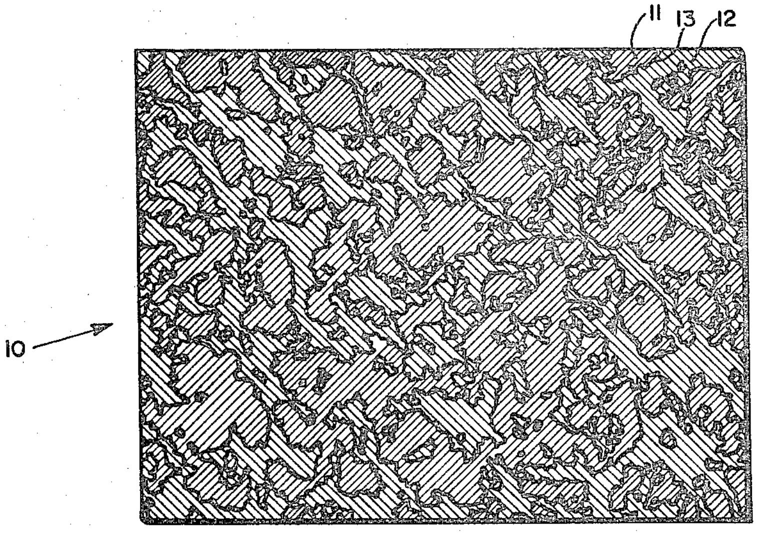
FIGURE 2 is a horizontal cross sectional view of a typical compact.

Referring to FIGURE 1, the final microstructure of a longitudinal section of structure of composite 10 is a fine network of elongated particles 11 and 12 of interspersed copper and silver particles separated by barrier material 13. FIGURE 2 is a cross section of the composite structure. The addition of third elements such as graphite, metallic oxides, metallic halides, etc., may be employed to provide special contact properties.

While make and break electrical contacts are cited as being illustrative of the present invention, the materials are also applicable to sliding contact members, electrical conductors, heat exchangers and other similar applications where the hereinabove mentioned properties would be advantageous.

While a particular embodiment has been described, it is to be understood that the invention is not restricted in scope to the embodiment disclosed herein, and that modifications may be made within the scope indicated by the appended claims without departing from the spirit and scope of the invention, which is applicable to contacts, sliding contacts and other applications requiring high thermal and electrical conductivity or other applications where silver of high-silver content alloys are presently employed.

Having thus described our invention, we claim:

1. An electrically and thermally conductive composite material consisting of about 20–70% copper by weight of said composite, the balance being silver, said copper and said silver being in particulate form, at least one of said materials having a coating of a barrier material to separate said copper from said silver such that each retains its own identity, said barrier material being in an amount up to 10% by weight of the total weight of said copper and said silver material containing silver from said highly conductive material such that said material containing silver and said conductive material retains its own identity.

2. An electrically and thermally conductive material according to claim 1, wherein said barrier material prevents diffusion between said silver and said Cu.

3. An electrically and thermally conductive material according to claim 1, wherein said particles are bonded together.

4. An electrically and thermally conductive material according to claim 3, wherein said composite is sintered to achieve said bonding.

5. An electrically and thermally conductive composite material according to claim 1, wherein said barrier material is taken from the group consisting of iron, nickel, cobalt, and their alloys.

6. An electrically and thermally conductive composite material according to claim 1, wherein said silver is coated with said barrier material.

7. An electrically and thermally conductive composite material according to claim 1, wherein said silver is coated with nickel.

8. An electrically and thermally conductive composite material according to claim 1, wherein said copper is in an amount of about 50% by weight of the composite the balance being essentially silver.

9. An electrically and thermally conductive composite material according to claim 1, wherein said coating of barrier material has a thickness of at least 2 angstroms.

10. An electrically and thermally conductive composite material according to claim 1, wherein said coating of barrier material has a thickness of about 2 angstroms.

11. An electrically and thermally conductive composite material consisting of from about 20–70% silver by weight of said composite, the balance being copper, said silver and said copper being in particulate form, said silver particles having a coating having a thickness of at least 2 angstroms of a barrier material taken from the group consisting of iron, nickel, cobalt, and their alloys, said particles being bonded together to form said composite, said composite maving a minimum electrical conductivity of at least 95% I.A.C.S.

References Cited

UNITED STATES PATENTS

| | | | |
|---|---|---|---|
| 2,159,763 | 5/1939 | Hensel | 29—182 |
| 2,198,254 | 4/1940 | Koehring | 29—182.1 |
| 2,370,400 | 2/1945 | Graves | 29—182 |
| 2,439,570 | 4/1948 | Hensel | 75—212 X |
| 3,045,331 | 7/1962 | Ang | 29—182 |

CARL D. QUARFORTH, *Primary Examiner.*

A. J. STEINER, *Assistant Examiner.*